United States Patent
Dubeyko et al.

(10) Patent No.: US 10,884,664 B2
(45) Date of Patent: Jan. 5, 2021

(54) EXECUTABLE MEMORY CELL

(71) Applicant: Western Digital Technologies, Inc., San Jose, CA (US)

(72) Inventors: Viacheslav Dubeyko, San Jose, CA (US); Luis Vitorio Cargnini, San Jose, CA (US)

(73) Assignee: Western Digital Technologies, Inc., San Jose, CA (US)

(*) Notice: Subject to any disclaimer, the term of this patent is extended or adjusted under 35 U.S.C. 154(b) by 0 days.

(21) Appl. No.: 16/354,053

(22) Filed: Mar. 14, 2019

(65) Prior Publication Data

US 2020/0293223 A1    Sep. 17, 2020

(51) Int. Cl.
  *G06F 12/00* (2006.01)
  *G06F 3/06* (2006.01)

(52) U.S. Cl.
  CPC ......... *G06F 3/0659* (2013.01); *G06F 3/0604* (2013.01); *G06F 3/0673* (2013.01)

(58) Field of Classification Search
  CPC .... G06F 3/0659; G06F 3/0604; G06F 3/0673; G06F 12/0848
  See application file for complete search history.

(56) References Cited

U.S. PATENT DOCUMENTS

| | | | |
|---|---|---|---|
| 4,293,733 A | 10/1981 | Patil | |
| 5,398,198 A | 3/1995 | Mahant-Shetti et al. | |
| 5,678,021 A | 10/1997 | Pawate et al. | |
| 6,609,236 B2 | 8/2003 | Watanabe et al. | |
| 8,117,567 B2 | 2/2012 | Arsovski | |
| 8,780,634 B2 | 7/2014 | Li et al. | |
| 2003/0023960 A1 | 1/2003 | Khan et al. | |
| 2003/0222877 A1 | 12/2003 | Tanaka et al. | |
| 2010/0312990 A1 | 12/2010 | Walker | |
| 2010/0312998 A1 | 12/2010 | Walker | |
| 2010/0312999 A1 | 12/2010 | Walker | |
| 2011/0093662 A1 | 4/2011 | Walker et al. | |
| 2011/0093665 A1 | 4/2011 | Walker et al. | |

(Continued)

FOREIGN PATENT DOCUMENTS

| CN | 108009119 | 5/2018 |
|---|---|---|
| EP | 2419821 | 2/2012 |
| JP | 2018133087 | 8/2018 |

OTHER PUBLICATIONS

International Search Report and Written Opinion dated Mar. 26, 2020 in International Patent Application No. PCT/US2019/067655.

(Continued)

*Primary Examiner* — Shawn X Gu
(74) *Attorney, Agent, or Firm* — Vierra Magen Marcus LLP

(57) ABSTRACT

A memory system includes a memory having a first executable memory cell and a compilation unit. The compilation unit is configured to receive a sequence of instructions from a host device, convert each of the sequence of instructions into an execution stream, load a first code from the execution stream into a code portion of the first executable memory cell and load a first data from the execution stream into a data portion of the first executable memory cell. The first executable memory cell is configured to apply the first code to the first data via an arithmetic and logic unit of the first executable memory cell.

20 Claims, 11 Drawing Sheets

(56) References Cited

U.S. PATENT DOCUMENTS

| | | | |
|---|---|---|---|
| 2012/0017070 A1 | 1/2012 | Hieda | |
| 2012/0216012 A1 | 8/2012 | Vorbach et al. | |
| 2015/0106574 A1 | 4/2015 | Jayasena et al. | |
| 2018/0081583 A1* | 3/2018 | Breternitz | G06F 15/7821 |
| 2018/0157488 A1 | 6/2018 | Shu et al. | |
| 2018/0336035 A1 | 11/2018 | Choi et al. | |

OTHER PUBLICATIONS

English language Abstract for JP2018133087 published Aug. 23, 2018.

International Search Report and Written Opinion dated Mar. 12, 2020 in International Patent Application No. PCT/US2019/067660.

English language Abstract for CN108009119 published May 8, 2018.

Bhattacharjee, et al., "Crossbar-Constrained Technology Mapping for ReRAM based In-Memory Computing," *School of Computer Science and Engineering*, 14 pages (Sep. 2018).

Can Onur Avci, et al., "A Multi-State Memory Device Based on the Unidirectional Spin Hall Magnetoresistance," *Applied Physics Letters*, vol. 110, 4 pages (May 2017).

Siemon, et al., "A Complementary Resistive Switch-Based Crossbar Array Adder," *IEEE Journal on Emerging and Selected Topics in Circuits and Systems*, vol. 5, No. 1, pp. 64-74, (Mar. 2015).

Zhang et al., "Demonstration of Multi-State Memory Device Combining Resistive and Magnetic Switching Behaviors," *IEEE Electron Device Letters*, vol. 39, No. 5, pp. 684-687 (May 2018).

Viacheslav Dubeyko, et al., "Dutch Scientists Develop Brain-Inspired Memory Material," *Electronic News*, 2 pages Jul. 8, 2016.

Response to Office Action filed Sep. 29, 2020 in U.S. Appl. No. 16/354,038.

Office Action dated Jul. 7, 2020 in U.S. Appl. No. 16/354,038.

Adibi et al., "Processing-In-Memory Technology for Knowledge Discovery Algorithms", DaMoN 2006: Proceedings of the Second International Workshop on Data Management on New Hardware, Jun. 25, 2006.

Carnegie Mellon University, Department of Computer Science, "Modern Multi-Core Architecture", Spring 2012.

\* cited by examiner

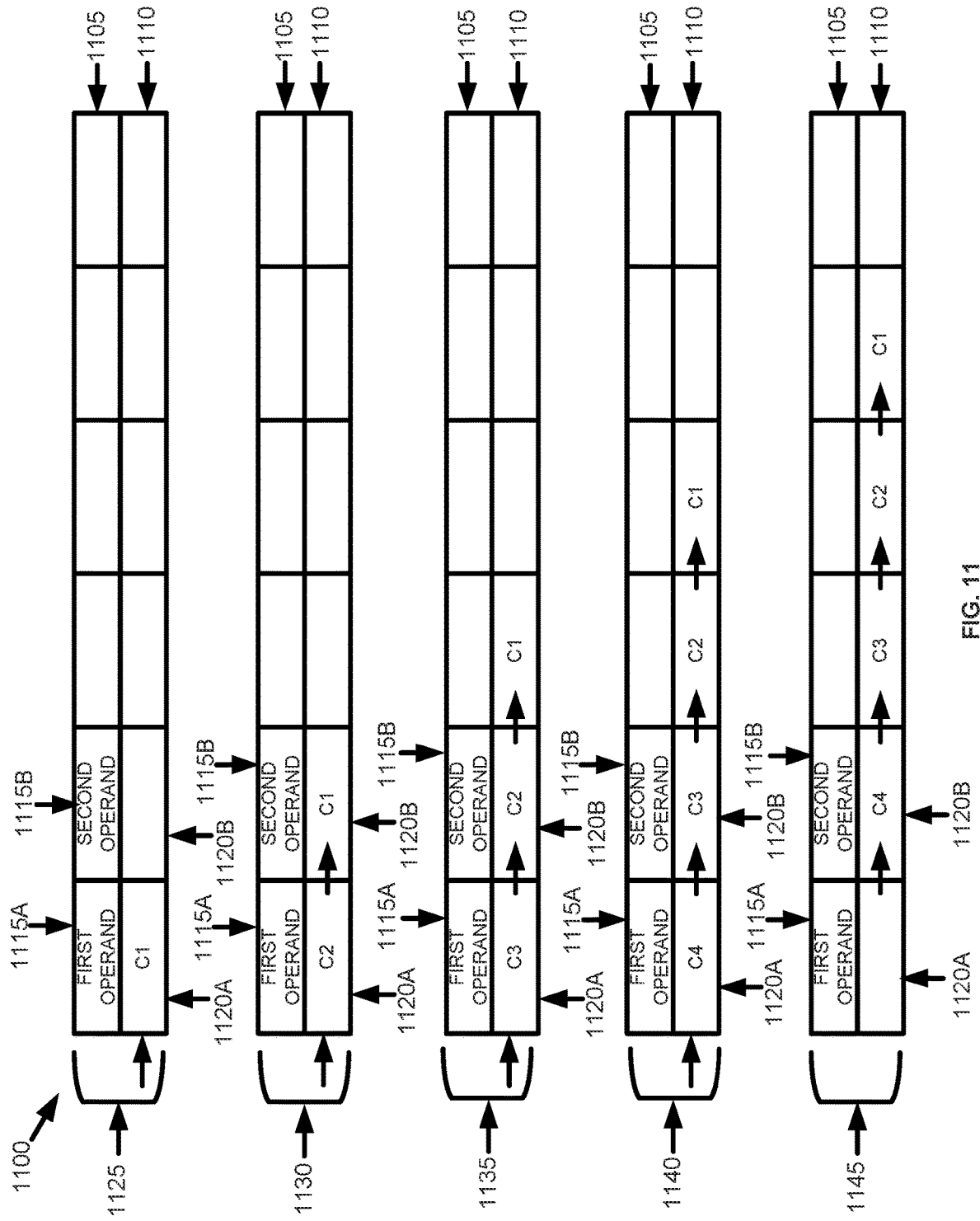

US 10,884,664 B2

EXECUTABLE MEMORY CELL

CROSS-REFERENCE TO RELATED APPLICATIONS

This application is related to U.S. patent application Ser. No. 16/354,038 filed Mar. 14, 2019, the entirety of which is incorporated by reference herein.

BACKGROUND

The following description is provided to assist the understanding of the reader. None of the information provided or references cited is admitted to be prior art.

Computing techniques for processing data generally require copying executable code and data from a persistent storage into a volatile memory before applying the executable code to the data. The results of the processing are then returned to the persistent storage. As computing systems evolve to provide persistent storage with faster read and write speeds, the above approach of transferring data back and forth between the persistent storage and the volatile memory leads to processing limitations and noticeable bottlenecks. Thus, the present day computing mechanisms have limitations due to their configuration and the way they operate.

SUMMARY

In accordance with some aspects of the present disclosure, a memory system is disclosed. The memory system includes a memory having a first executable memory cell and a compilation unit. The compilation unit is configured to receive a sequence of instructions from a host device, convert each of the sequence of instructions into an execution stream, load a first code from the execution stream into a code portion of the first executable memory cell and load a first data from the execution stream into a data portion of the first executable memory cell. The first executable memory cell is configured to apply the first code to the first data via an arithmetic and logic unit of the first executable memory cell.

In accordance with some other aspects of the present disclosure, another memory system is disclosed. The memory system includes a memory having a first executable memory cell and a compilation unit. The compilation unit is configured to create a code stream from a sequence of instructions. The code stream includes a plurality of code cells, each of the plurality of code cells storing a sub-code. The compilation unit is also configured to create a data stream from the sequence of instructions for storing a first operand and a second operand and load a first sub-code into the first executable memory cell. The first sub-code is stored in a first code cell of the plurality of code cells. The compilation unit is further configured to load the first operand into the first executable memory cell and shift the first sub-code from the first code cell to a second code cell of the plurality of code cells.

In accordance with yet other aspects of the present disclosure, a non-transitory computer-readable media including computer-executable instructions embodied thereon is disclosed. The instructions, when executed by a processor, cause the processor to perform a process including receiving a sequence of instructions, converting each of the sequence of instructions to create an execution stream, loading a first code from the execution stream into a code portion of a first executable memory cell, and loading a first data from the execution stream into a data portion of the first executable memory cell. The process also includes applying the first code to the first data via an arithmetic and logic unit of the first executable memory cell.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

FIG. 11 is an example flow diagram showing operations performed using the execution stream of FIG. 9, in accordance with some embodiments of the present disclosure.

Figure 1:
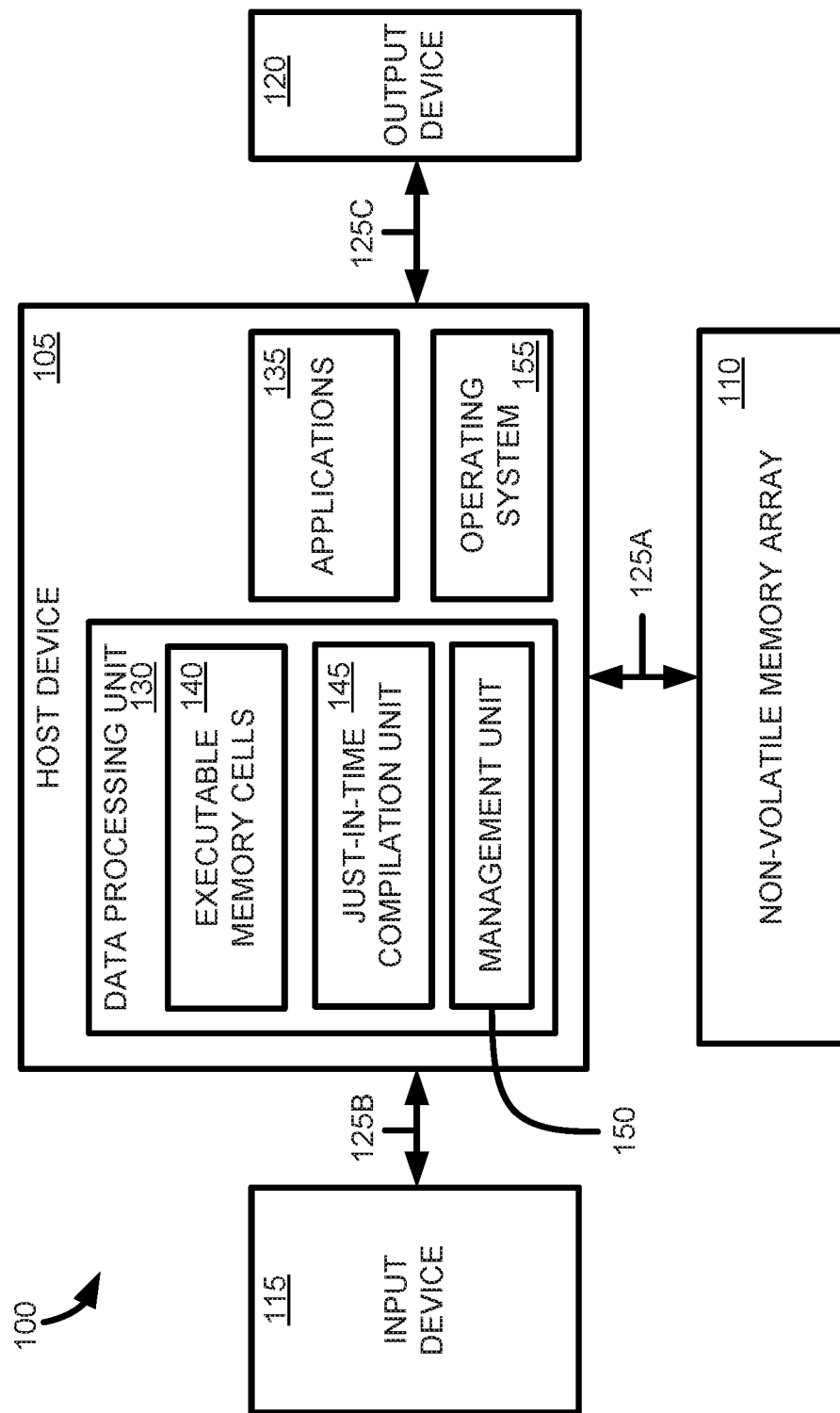
FIG. 1 is an example block diagram of a computing system, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Modern computing techniques rely on a centralized approach for processing data. The centralized approach uses a host device having a central processing unit (CPU) and a volatile or main memory associated with the CPU, as well as a persistent storage (e.g., non-volatile memory associated with memory controller) from which data and executable code are transferred to the volatile memory for processing data. Once data processing is complete, the results of data processing are transferred back from the volatile memory to the persistent storage. As the persistent storage technology evolves to process requests with faster read and write speeds, the back and forth transfer of data in the centralized approach leads to data processing limitations. These limitations are exacerbated by big data, and increasing complexities and demands in big data processing.

One mechanism for increasing performance in the centralized approach is to increase the number of CPU cores. However, increasing the number of CPU cores improves data processing performance only to a certain extent. Increasing the number of CPU cores does not reduce the overhead resulting from other components, such as the task scheduler, the coherence protocol, etc., which impact data processing performance significantly. Increasing the number of CPU cores also does not address the inefficiencies resulting from the transfer of data between the volatile memory and the persistent storage. Additionally, increasing the number of CPU cores does not take advantage of the improvements in persistent storage technology. Thus, while increasing the number of CPU cores may improve performance to a certain extent, this approach has a number of limitations.

Accordingly, the present disclosure provides technical solutions for storing data and processing that data in the place of storage. Thus, the present disclosure provides a data processing unit having a plurality of executable memory cells. Each of the plurality of executable memory cells has capability to both store data and process the data stored therein. Specifically, each of the plurality of executable memory cells includes a data portion for storing the data, a code portion for storing code for processing the data, and an arithmetic and logic unit for performing an operation or applying the code to the data. By both storing and transforming data within each of the plurality of executable memory cells, the present disclosure provides faster data processing and improved performance. Further, each of the plurality of executable memory cells may perform data processing in parallel, thus enabling concurrent data processing for further improvements in performance. By storing and processing the data in the same executable memory cell, the back and forth transfer of data and code is minimized and power efficiency is improved.

Referring to FIG. 1, an example block diagram of a computing system 100 is shown, in accordance with some embodiments of the present disclosure. The computing system 100 includes a host device 105 associated with a non-volatile memory array 110. The host device 105 may be configured to receive input from one or more input devices 115, and provide output to one or more output devices 120. The host device 105 may be configured to communicate with the non-volatile memory array 110, the input devices 115, and the output devices 120 via appropriate interfaces 125A, 125B, and 125C, respectively. The computing system 100 may be implemented in a variety of computing devices such as computers (e.g., desktop, laptop, etc.), tablets, personal digital assistants, mobile devices, wearable computing devices such as smart watches, other handheld or portable devices, or any other computing unit suitable for performing operations using the host device 105.

The input devices 115 may include any of a variety of input technologies such as a keyboard, stylus, touch screen, mouse, track ball, keypad, microphone, voice recognition, motion recognition, remote controllers, input ports, one or more buttons, dials, joysticks, and any other input peripheral that is associated with the host device 105 and that allows an external source, such as a user, to enter information (e.g., data) into the host device and send instructions to the host device. Similarly, the output devices 120 may include a variety of output technologies such as external memories, printers, speakers, displays, microphones, light emitting diodes, headphones, plotters, speech generating devices, video devices, global positioning systems, and any other output peripherals that are configured to receive information (e.g., data) from the host device 105. The "data" that is either input into the host device 105 and/or output from the host device may include any of a variety of textual data, graphical data, video data, sound data, position data, combinations thereof, or other types of analog and/or digital data that is suitable for processing using the computing system 100.

The host device 105 may include a data processing unit 130 that is configured to run applications 135. The data processing unit 130 may be configured to execute instructions (also referred to herein as executable code or code) for running the applications 135. The data processing unit 130 may be implemented in hardware, firmware, software, or any combination thereof. "Executing an instruction" means that the data processing unit 130 performs the operation(s) called for by that instruction. The data processing unit 130 may include one or more executable memory cells 140, a compilation unit 145, and a management unit 150. The executable memory cells 140 are configured to both store and process data. In other words, the executable memory cells 140 may be configured to store data and perform operations called for by an instruction on that data. The compilation unit 145 converts an instruction into a form that is understood by the executable memory cells 140 and prepares an execution stream for use by the executable memory cells. The management unit 150 manages and controls the compilation unit 145 and the processing of data by the executable memory cells 140.

Thus, in some embodiments, the data processing unit 130 may, directly or indirectly, retrieve the instructions from the compilation unit 145, copy the instructions in an executable form to the executable memory cells 140, and apply those instructions to the data that is also stored within those executable memory cells. The data processing unit 130 may be a special purpose computer, and include logic circuits (e.g., arithmetic logic unit), hardware circuits, etc. to carry out the instructions. The instructions that the data processing unit 130 is configured to execute may be written using one or more programming language, scripting language, assembly language, etc. In some embodiments, the executable memory cells 140 may be part of the non-volatile memory array 110 in which case the data processing unit 130 may be replaced by a traditional central processing unit and a main memory in the host device 105, and in such a case, the executable memory cells 140 may be provided with its own data processing unit 130 and other supporting units such as the compilation unit 145 and the management unit 150 to perform the functions described herein within the non-volatile memory array 110. In some embodiments, the data processing unit 130 having the executable memory cells 140, as well as the non-volatile memory array 110 having one or more executable memory cells (e.g., similar to the executable memory cells 140) may be used. By storing the data in the executable memory cells 140 (whether in the data processing unit 130 and/or in the non-volatile memory array 110) and also processing the data in the place that the data is stored (e.g., in the executable memory cells), the computing system 100 is configured to run the applications 135 more efficiently and quickly.

Each of the applications 135 is a software program or group of programs that is configured to perform one or more operations for accomplishing one or more goals. The applications 135 may be configured for use by end users. In that regard, the applications 135 may be considered end user applications. In some embodiments, the applications 135 may be system or utility applications. The number and type (e.g., what the application is designed to accomplish) of the applications 135 may vary from one embodiment to another depending upon the environment in which the computing system 100 is used. The computing system 100 may also include an operating system 155 that is configured to facilitate execution of the applications 135 by the data processing unit 130. The operating system 155 is a system software program that manages the various hardware and software resources of the computing system 100. Specifically, the operating system 155 serves as an intermediary between the hardware resources of the computing system 100 and the applications 135 requesting execution. The operating system 155 may be any of a variety of types of operating systems such as Microsoft Windows, macOS, iOS, Android, UNIX, Linux, etc. that are suitable for the computing system 100.

The non-volatile memory array 110 may include any of a variety of non-volatile memory devices that are capable of performing selectable memory location level programming and erasing without altering data stored at other selectable levels. For example, each bit in the non-volatile memory array 110 may be independently alterable without altering data stored in other bits in the non-volatile memory. Thus, the non-volatile memory array 110 may be configured to write a "0" or a "1" (or alter the storage state) of any single bit without changing any other accessible bit. The non-volatile memory array 110 may be configured to be byte-wise alterable, word-wise alterable, and/or alterable in other granularities. In some embodiments, the non-volatile memory array 110 may be any of a variety of persistent or non-persistent memory devices suitable for use in the computing system 100. For example, in some embodiments, the non-volatile memory array 110 may be any of a variety of persistent storage device such as phase-change memory (PCM) devices, resistive random-access memory (ReRAM) devices, dynamic random access memory (DRAM), magnetoresistive random-access memory (MRAM) devices, ferroelectric random-access memory (FeRAM), holographic memory devices. In other embodiments, any other type of non-volatile memory device suitable for use in the computing system 100 may be used.

Further, although not shown, the non-volatile memory array 110 may include a memory controller to communicate with the host device 105, and particularly, with the operating system 155 to facilitate execution of the applications 135.

It is to be understood that only some components of the computing system 100 are shown and described in FIG. 1. However, the computing system 100 may include other components such as various batteries and power sources, networking interfaces, routers, switches, external memory systems, controllers, etc. Generally speaking, the computing system 100 may include any of a variety of hardware, software, and/or firmware components that are needed or considered desirable in performing the functions described herein.

Figure 2:
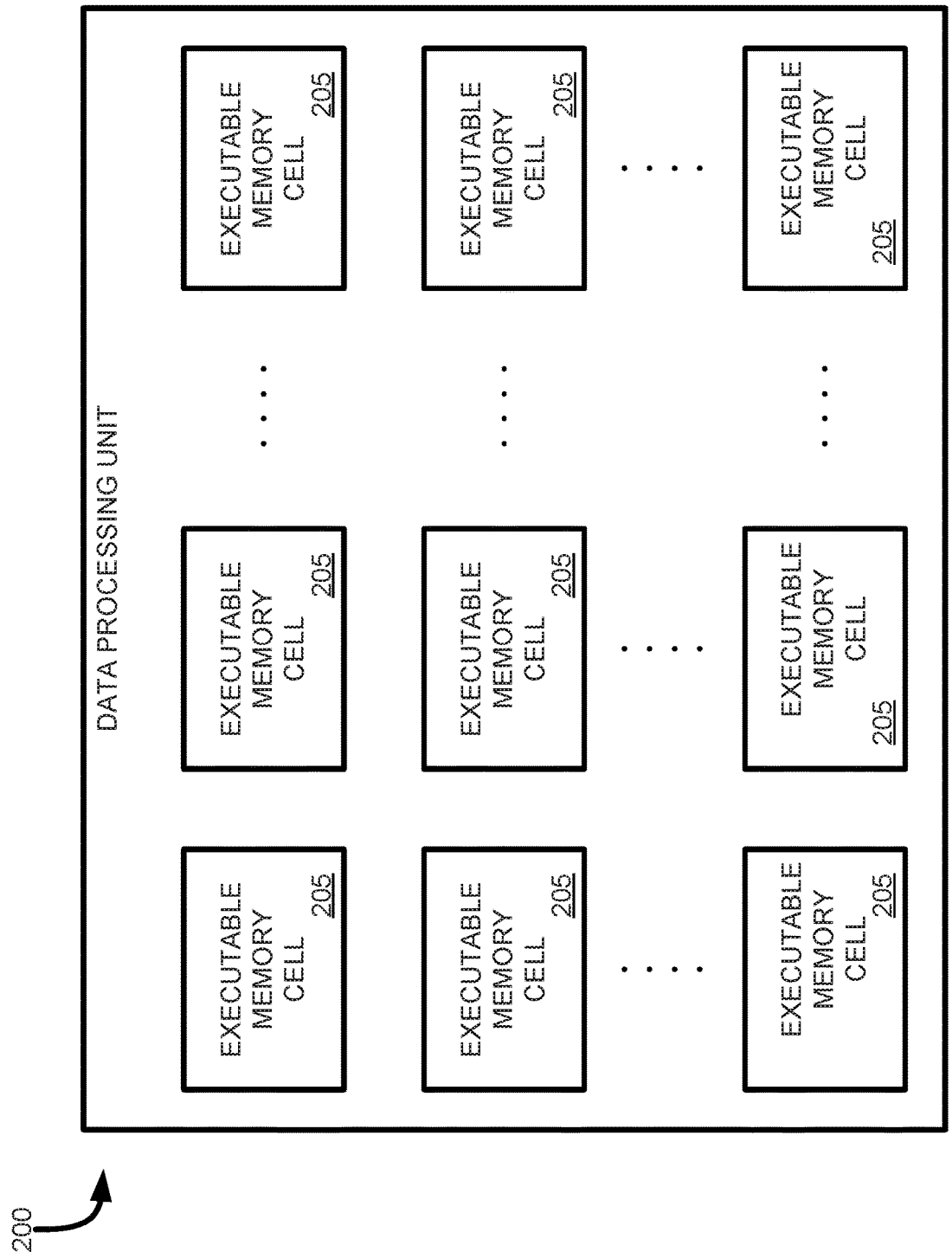
FIG. 2 is an example block diagram of a data processing unit of the computing system of FIG. 1, in accordance with some embodiments of the present disclosure.

Turning now to FIG. 2, an example block diagram of a data processing unit 200 is shown, in accordance with some embodiments of the present disclosure. The data processing unit 200 is similar to the data processing unit 130 of FIG. 1. The data processing unit 200 includes a plurality of executable memory cells 205. Each of the plurality of executable memory cells 205 is similar to each of the executable memory cells 140 of FIG. 1. Further, although not shown, the data processing unit 200 also includes a compilation unit (e.g., similar to the compilation unit 145), a management unit (e.g., similar to the management unit 150), and any other component that may be necessary or desirable in performing the functions described herein. Further, a number of the plurality of executable memory cells 205 in the data processing unit 200 may vary from one embodiment to another based upon the application in which the computing system associated with the data processing unit is used.

In some embodiments, one or more of the plurality of executable memory cells 205 may be fabricated from any of the types of memories discussed above with respect to the non-volatile memory array 110. In some embodiments, one or more of the plurality of executable memory cells 205 may be fabricated from Static Random Access Memory (SRAM), Dynamic Random Access Memory (DRAM), Magnetoresistive Random Access Memory (MRAM), Phase Control Memory (PCM), Resistive Random Access Memory (ReRAM), 3D XPoint memory, ferroelectric random-access memory (FeRAM), holographic memory devices, and other types of byte addressable memory. In some embodiments, one or more of the plurality of executable memory cells 205 may include a hybrid memory that includes a volatile memory portion and a non-volatile memory portion. Further, in some embodiments, all of the plurality of executable memory cells 205 may be fabricated from the same type of memory, while in other embodiments, one or more of the plurality of executable memory cells may be fabricated from different types of memory.

Additionally, in some embodiments, each of the plurality of executable memory cells 205 is configured to store one byte of binary information. In other embodiments, one or more of the plurality of executable memory cells 205 may be configured to store greater than or less than one byte of binary information. Thus, each of the plurality of executable memory cells 205 may be a single-level cell or a multi-level cell. In some embodiments, each of the plurality of executable memory cells 205 may have multiple physical levels (e.g., 256 levels), which may be used for implementing arithmetic and logical operations therein. For example, in some embodiments, multiplication and division operations may be facilitated within each of the plurality of executable memory cells 205 by means of shifting of the physical levels left (for multiplication) and right (for division). The shifting of the physical levels may be based, in some embodiments, on switching the states of an executable memory cell by applying different voltage values. Similarly, in some embodiments, addition, subtraction, and logical operations may be implemented by the plurality of executable memory cells 205 using shifting operations. In other embodiments, one or more of the plurality of executable memory cells 205 may implement other or additional mechanisms to facilitate arithmetic and logical operations.

Further, in some embodiments, some of the plurality of executable memory cells 205 may be optimized for performing certain arithmetic and logical operations, while other ones of the plurality of executable memory cell may be optimized for performing other arithmetic and logical operations. Thus and generally speaking, depending upon the type of memory and configuration of a particular executable memory cell, the amount of information stored in and the type of operations performed by each of the plurality of executable memory cells 205 may vary from one embodiment to another.

Additionally, the plurality of executable memory cells 205 may all be located on a single memory chip or multiple memory chips. Further, at least some of the plurality of executable memory cells 205 may be interconnected with one another. For example, in some embodiments, at least some of the plurality of executable memory cells 205 may be interconnected using an interconnection network. The interconnection network may be any of a variety of network-based communication mechanisms that allow the plurality of executable memory cells 205 to communicate with one another. In some embodiments and particularly when the plurality of executable memory cells 205 are all located on a single memory chip, the interconnection network may be a Network on Chip ("NoC") interconnection. In some embodiments, other mechanisms of facilitating communication between the plurality of executable memory cells 205 may be used. When located on multiple chips, an interconnection network may be selected that allows the plurality of executable memory cells 205 to communicate even while being located on different chips. Further, the interconnection network may allow the plurality of executable memory cells 205 to communicate directly and/or indirectly via another component.

Further, in some embodiments, each of the plurality of executable memory cells 205 may be associated with an instance of the management unit (e.g., the management unit 150), while in other embodiments, one instance of the management unit may be configured to manage all or at least some of the plurality of executable memory cells. In some embodiments, one or more of the plurality of executable memory cells 205 may have a management unit that is separate from the management unit (e.g., the management unit 150) of the computing system (e.g., the computing system 100).

Figure 3:
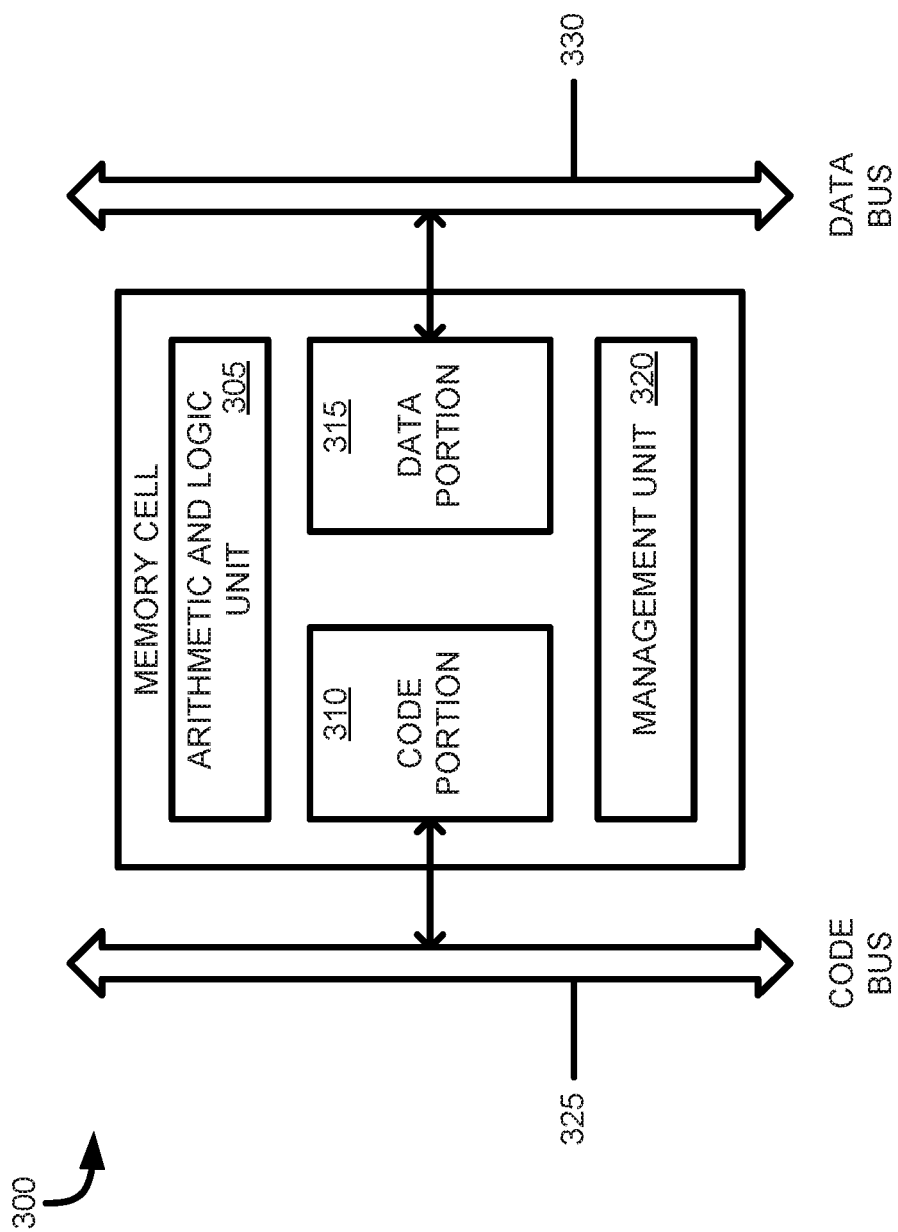
FIG. 3 is an example block diagram of a memory cell of the data processing unit of FIG. 2, in accordance with some embodiments of the present disclosure.

Referring now to FIG. 3, an example block diagram of an executable memory cell 300 is shown, in accordance with some embodiments of the present disclosure. The executable memory cell 300 is similar to the executable memory cells 140 and the plurality of executable memory cells 205. The executable memory cell 300 includes an arithmetic and logic unit 305 that is configured to execute an instruction, a code portion 310 where the code (e.g., executable code) being executed is stored, and a data portion 315 where the data on which the code from the code portion is applied is stored. The executable memory cell 300 also includes a management unit 320 that manages the execution in the arithmetic and logic unit 305 using the code stored in the code portion 310 and the data stored in the data portion 315. The management unit 320 may also be configured to load the code in the code portion 310 via a code bus 325 and load the data in the data portion 315 via a data bus 330. The management unit 320 may further be configured to store the result of the execution in the code portion 310, in the data portion 315, or in another dedicated result portion (not shown) of the executable memory cell 300. In some embodiments, the management unit 320 may send the result of the execution to another executable memory cell via the data bus 330, to another component of the associated data processing unit (e.g., the data processing unit 130, 200), and/or to the output devices 120. Further, although the management unit 320 is shown as part of the executable memory cell 300, in some embodiments, the management unit may be outside of the executable memory cell (e.g., as shown in FIG. 1) and manage the operations within the executable memory cell.

Further, the code portion 310 and the data portion 315 may be dedicated memory portions of the executable memory cell 300 that are dedicated to storing execution ready code and data, respectively. In some embodiments, the code portion 310 and the data portion 315 may be configured to store a single piece of code and data, respectively, at a time, while in other embodiments, the code portion and/or the data portion may store multiple pieces of code and data, respectively, depending upon their respective sizes.

The arithmetic and logic unit 305 is configured to perform basic arithmetic and logic operations. For example, in some embodiments, the arithmetic and logic unit 305 may be configured to perform addition, subtraction, multiplication, division, logical OR, NOT, AND, XOR, NOR, and NAND operations. In some embodiments, the arithmetic and logic unit 305 may be configured to perform additional or other operations as well. In some embodiments, the arithmetic and logic unit 305 may include a set of functional blocks, with each functional block being able to execute one operation (OR, XOR, addition, subtraction, and so on). Also, as discussed above, the manner in which the arithmetic and logic unit 305 performs the various arithmetic and logic operations may vary based upon the type of memory that is used to construct the executable memory cell, and particularly the arithmetic and logic unit portion of the executable memory cell. For example, in some embodiments, the arithmetic and logic unit 305 may perform arithmetic and logic operations by shifting physical levels of the executable memory cell 300, reprogramming memory cells, resistive switching, magnetic switching, or using other mechanisms suitable for the type of memory used for the executable memory cell.

Figure 4:
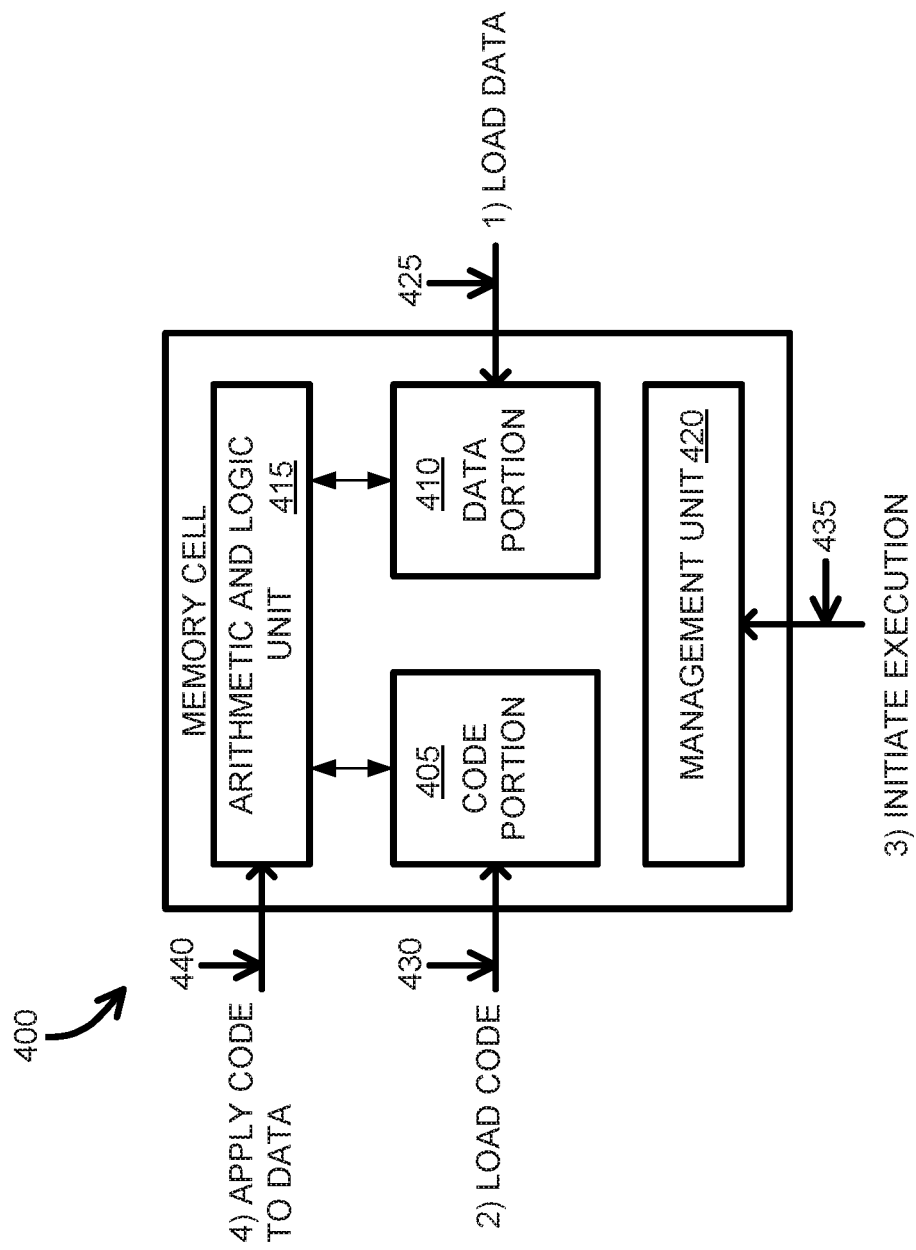
FIG. 4 is an example flow diagram showing a one operand operation performed by the memory cell of FIG. 3, in accordance with some embodiments of the present disclosure.

Turning now to FIG. 4, an example flow diagram outlining operations for performing a one operand operation in an executable memory cell 400 is shown, in accordance with some embodiments of the present disclosure. The flow diagram may include other, additional, or other operations depending upon the particular embodiment. The executable memory cell 400 is similar to the executable memory cell 300. Thus, the executable memory cell 400 also includes a code portion 405 to store code, a data portion 410 to store data, an arithmetic and logic unit 415 to apply the code from the code portion to the data from the data portion, and a management unit 420. The management unit 420 receives and stores the code in the code portion 405, receives and stores the data in the data portion 410, instructs the arithmetic and logic unit 415 to apply the code to the data, and receives the result of the application from the arithmetic and logic unit for storing in the data portion, code portion, and/or for transferring outside the executable memory cell 400 (or instruct the arithmetic and logic unit to store/transfer the result).

A one operand operation involves one variable (e.g., one piece of data) on which an operation is to be performed. An example of a one operand operation may include a NOT operation. To execute a one operand operation, the management unit 420 loads the data (e.g., operand) at operation 425 into the data portion 410 and loads the code at operation 430 into the code portion 405. In some embodiments, the management unit 420 may load the data in the data portion 410 before loading the code in the code portion 405. Further, in some embodiments, the data may have previously been stored in the data portion 410 of the executable memory cell 400. In such a case, the management unit 420 may not need to store the data in the data portion 410 at the time of performing the operation and may skip the operation 425. Also, to store the data in the data portion 410 and the code in the code portion 405, the management unit 420 may receive the data and the code from an executable stream generated by the compilation unit (e.g., the compilation unit 145) and/or from another executable memory cell.

Upon storing the data in the data portion 410 and the code in the code portion 405, the management unit 420 initiates the execution of the code at operation 435. As part of initiating, the management unit 420 may select one or more functional blocks of the arithmetic and logic unit 415 or one or more microprograms of the arithmetic and logic unit that apply the code from the code portion 405 to the data from the data portion 410. In some embodiments, the management unit 420 may apply a special voltage to select the functional block(s)/microprogram(s) of the arithmetic and logic unit 415, and connect the selected functional block(s)/microprogram(s) with the data portion 410. At operation 440, the arithmetic and logic unit 415 applies the code from the code portion 405 to the data from the data portion 410. Specifically, the data from the data portion 410 forms the input for the selected functional block(s)/microprogram(s) that the management unit selected at the operation 435. At the operation 440, the selected functional block(s)/microprogram(s) reads the data from the data portion 410, modifies the data, and stores the result. The selected functional block(s)/microprogram(s) may store the result in the data portion 410, in the code portion 405, or in any other designated location. In some embodiments, the management unit 420 may also be configured to store the result in the data portion 410, the code portion 405, and/or send the result to another component.

Figure 5:
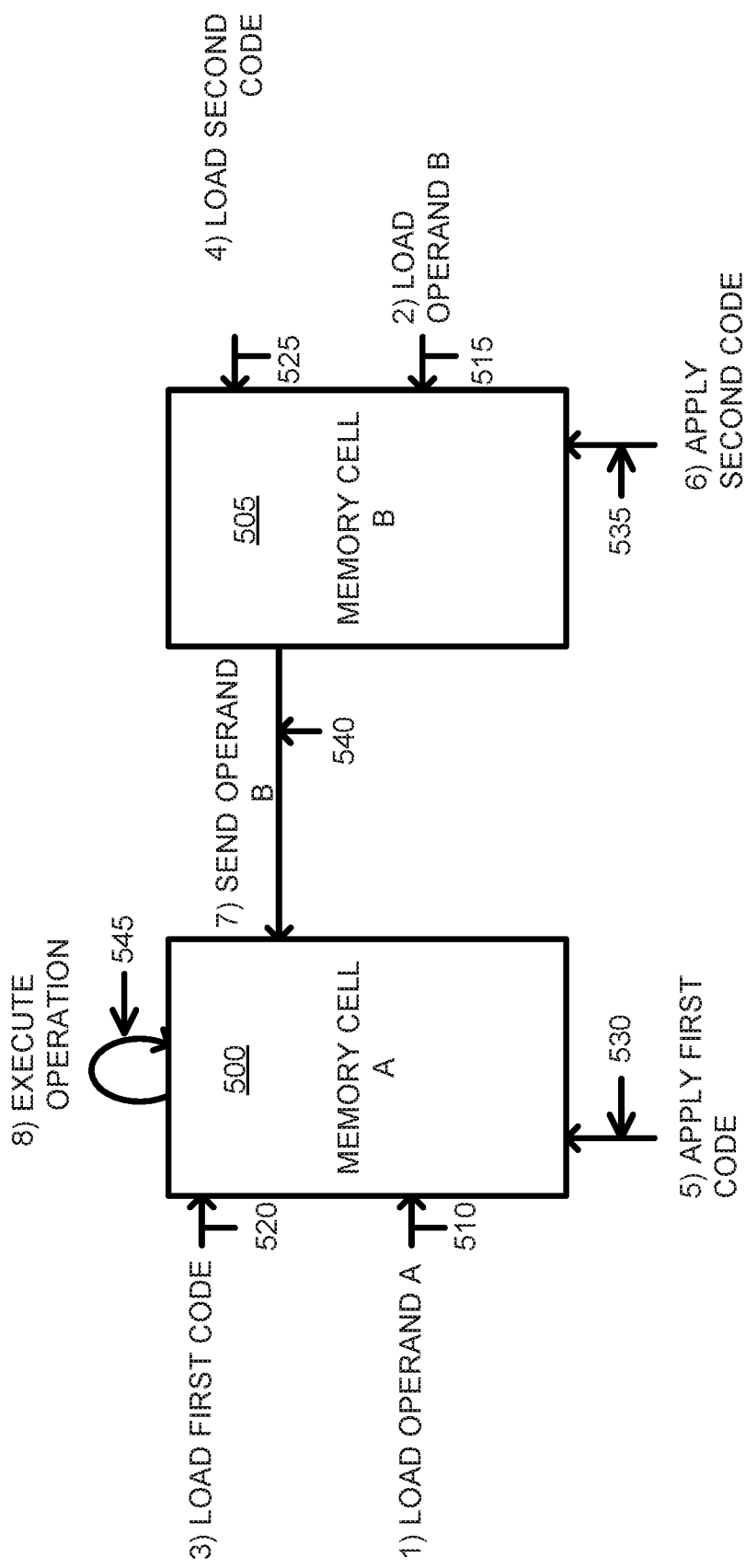
FIG. 5 is an example flow diagram showing a two operand operation performed by the memory cell of FIG. 3, in accordance with some embodiments of the present disclosure.

Referring to FIG. 5, an example flow diagram outlining operations for performing a two operand operation is shown, in accordance with some embodiments of the present disclosure. The flow diagram may include other, additional, or other operations depending upon the particular embodiment. A two operand operation involves two variables (e.g., two pieces of data) on which an operation is performed. Specifically, a two operand operation involves a left operand separated from a right operand by an operator. Thus, a two operand operation involves two executable memory cells—a first executable memory cell 500 for storing the left operand and a second executable memory cell 505 for storing the right operand. In some embodiments, the first executable memory cell 500 may store the right operand, while the second executable memory cell 505 may store the left operand.

The first executable memory cell 500 and the second executable memory cell 505 are similar to the executable memory cell 300. Thus, each of the first executable memory cell 500 and the second executable memory cell 505 includes a code portion to store executable code, a data portion to store data, an arithmetic and logic unit to apply the code from the code portion to the data stored in the data portion, and a management unit to facilitate the execution. For ease of explanation, the code portion, the data portion, the arithmetic and logic unit, and the management unit are not shown in the first executable memory cell 500 and the second executable memory cell 505.

To perform a two operand operation, the management unit of the first executable memory cell 500 stores the first operand in the data portion of the first executable memory cell at operation 510. At operation 515, the management unit of the second executable memory cell 505 stores the second operand in the data portion of the second executable memory cell. In some embodiments, the first operand and/or the second operand may have been stored previously in the data portions of the first executable memory cell 500 and the second executable memory cell 505, respectively. In such cases, the operation 510 and/or the operation 515 may be skipped. For example, if the first operand is already stored in the first executable memory cell 500 at the time of performing the two operand operation, the operation 510 may be skipped. Similarly, if the second operand is already stored in the second executable memory cell 505 at the time of performing the two operand operation, the operation 515 may be skipped.

Additionally, at operation 520, the management unit of the first executable memory cell 500 stores a first code in the code portion of the first executable memory cell, and at operation 525, the management unit of the second executable memory cell 505 stores a second code in the code portion of the second executable memory cell. The first code and the second code may be sub-codes of an instruction received from a host device (e.g., the host device 105). In some embodiments, the first code and the second code may be configured to be applied in a designated sequence. Further, in some embodiments, the first code may identify that the first operand is the left operand and the second code may identify that the second operand is the right operand. In some operations, such as subtraction, division, etc. the order of the operands may be important to performing an operation correctly. For example, if the operands are 5 and 3 and the operator is a subtraction operation, the function 5-3 and 3-5 yield different results. Thus, the first code and the second code may define the correct order in which the operands are to be used in the operation.

Further, in some embodiments, the first code and/or the second code may also identify the operator that is to be applied to the first operand and the second operand and/or define how the result of the operation is to be handled. In other embodiments, the management unit of the first executable memory cell 500 and/or the second executable memory cell 505 may receive a third code that defines the operation (e.g., the operator) that is to be applied on the first operand and the second operand and/or define how the result of the operation is to be handled. In some embodiments, the management unit of the first executable memory cell 500 and/or the second executable memory cell 505 may receive a fourth code that defines how the result of the operation is to be handled. Thus, the instruction may be divided into one or more sub-codes that may applied in a designated sequence to execute the instruction.

Further, the operations 510-525 may be performed in any order. The relative order in which the first operand, the second operand, the first code, and the second code are loaded into the first executable memory cell 500 and the second executable memory cell 505 may vary from one embodiment to another.

Upon storing the first operand and the first code in the first executable memory cell 500, operation 530 begins. At the operation 530, the management unit of the first executable memory cell 500 instructs the arithmetic and logic unit of the first executable memory cell that the first operand is to be designated as the left operand. The management unit may also select the functional block(s)/microprogram(s) in the arithmetic and logic unit to apply the first code to the first operand. Similarly, upon storing the second operand and the second code in the second executable memory cell 505, operation 535 begins. At the operation 535, the management unit of the second executable memory cell 505 instructs the arithmetic and logic unit of the second executable memory cell that the second operand is to be designated as the right operand. The management unit may also select the functional block(s)/microprogram(s) in the arithmetic and logic unit to apply the second code to the second operand. The operations 530 and 535 may be executed simultaneously.

Further, in some embodiments in which additional codes (e.g., third code, fourth code, etc.) are used, upon completion of the operations 530 and 535, the management units of the first executable memory cell 500 and the second executable memory cell 505 may receive the code that is to be applied next. The management units may store these additional codes in the code portions of their respective executable memory cells. Upon receiving and storing the additional codes or if the additional executable code portions are not needed, at operation 540, the management unit of one of the executable memory cells transfers the operand stored therein to the other executable memory cell. In some embodiments, the executable memory cell storing the left operand may transfer the left operand to the executable memory cell that is storing the right operand. In other embodiments, the executable memory cell storing the right operand may transfer the right operand to the executable memory cell that is storing the left operand.

Thus, as shown in FIG. 5, the second executable memory cell 505 transfers the second operand to the first executable memory cell 500 that stores the first operand. Upon receiving the second operand, the management unit of the first executable memory cell 500 may move the first operand to the code portion of the first executable memory cell, and store the second operand in the data portion of the first executable memory cell. In some embodiments, the management unit of the first executable memory cell 500 may not store the second operand in the data portion of the first executable memory cell. Rather, the management unit may store the second operand in the code portion or directly connect the second operand to the arithmetic logic unit of the first executable memory cell.

At operation 545, the management unit of the first executable memory cell 500 instructs the arithmetic and logic unit of the first executable memory cell to perform the execution. Specifically, in some embodiments, the management unit of the first executable memory cell 500 may select the functional block(s)/microprogram(s) of the arithmetic and logic unit of the first executable memory to apply to the first operand and the second operand. Upon receiving instructions from the management unit, the selected functional block(s)/microprogram(s) of the arithmetic and logic unit of the first executable memory cell 500 executes the operation (e.g., applies the code to the first operand and the second operand) and obtains a result. The arithmetic and logic unit or the management unit of the first executable memory cell 500 may store the result in the data portion of the first executable memory cell, the code portion of the first executable memory cell, transfer the result to the second executable memory cell 505, or transfer the result to another component. In some embodiments, upon completion of the operation 545, the management unit of the first executable memory cell 500 may receive another code defining how the result is to be handled.

Figure 6:
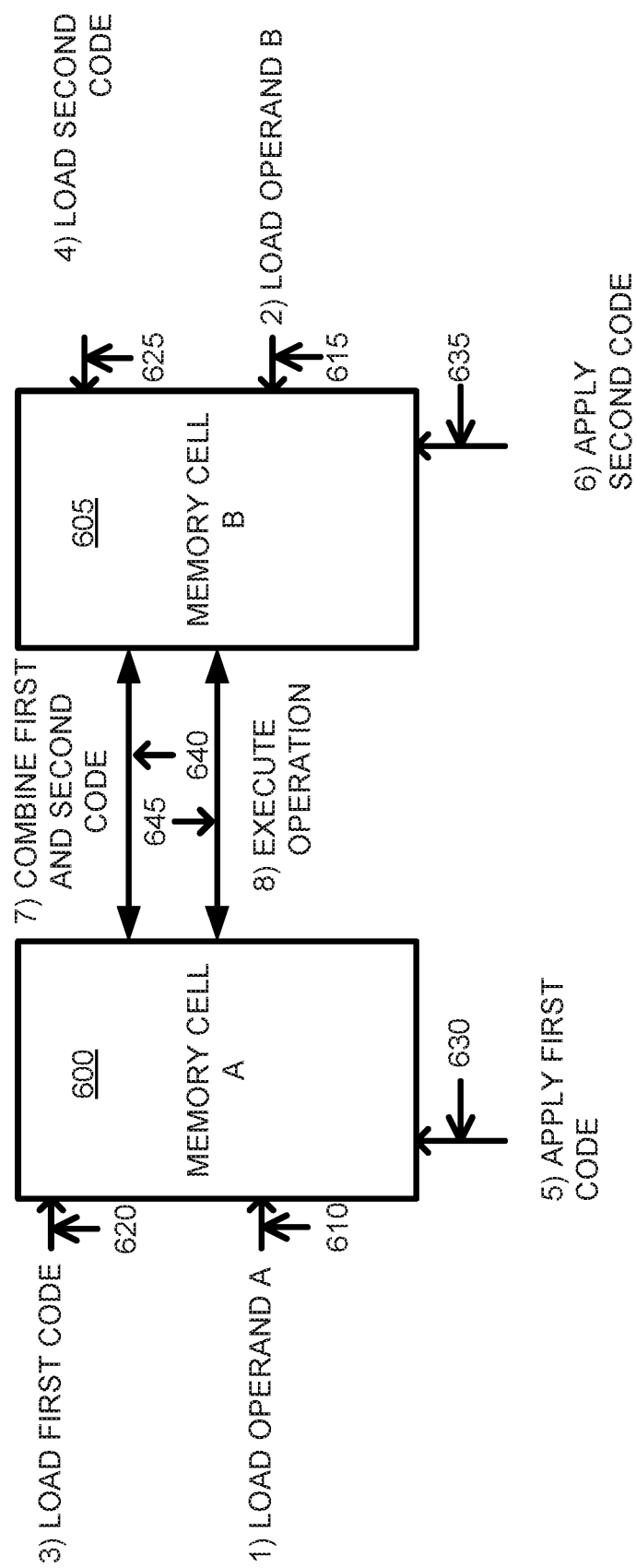
FIG. 6 is another example flow diagram showing the two operand operation performed by the memory cell of FIG. 3, in accordance with some embodiments of the present disclosure.

Referring to FIG. 6, an example flow diagram showing another two operand operation is shown, in accordance with some embodiments of the present disclosure. The flow diagram may include other, additional, or other operations depending upon the particular embodiment. Similar to FIG. 5, the two operand operation of FIG. 6 is performed by two executable memory cells—a first executable memory cell 600 and a second executable memory cell 605. The first executable memory cell 600 and the second executable memory cell 605 are similar to the executable memory cell 300. Thus, although not shown, each of the first executable memory cell 600 and the second executable memory cell 605 include a code portion to store code, a data portion to store data, an arithmetic and logic unit to apply the code from the code portion to the data from the data portion, and a management unit to facilitate the operation.

To perform the two operand operation, the management unit of the first executable memory cell 600 stores the first operand (e.g., first piece of data) in the data portion of the first executable memory cell at operation 610. At operation 615, the management unit of the second executable memory cell 605 stores the second operand (e.g., second piece of data) in the data portion of the second executable memory cell. In some embodiments, the first operand and/or the second operand may have been previously stored in the first executable memory cell and/or the second executable memory cell, respectively. In such cases, the operation 610 and/or the operation 615 may be skipped.

Additionally, at operation 620, the management unit of the first executable memory cell 600 stores the first code in the code portion of the first executable memory cell, and at operation 625, the management unit of the second executable memory cell 605 stores the second code in the code portion of the second executable memory cell. Again, the relative order in which the first data, the second data, the first code, and the second code are loaded into the first executable memory cell 600 and the second executable memory cell 605 may vary from one embodiment to another.

Further, the first code may identify whether the first operand is the left operand or the right operand, and the second code may identify whether the second operand is the right operand or the left operand. The first code and/or the second code may also select the functional block(s)/microprogram(s) of the respective arithmetic and logic unit that is to be applied on the first operand and the second operand. In some embodiments, a third code may be used to define the operation. Further, in some embodiments, a fourth code may be used to manage the result of the operation, as discussed above with respect to FIG. 5.

Upon storing the first operand and the first code in the first executable memory cell 600, at operation 630, the management unit of the first executable memory cell instructs the arithmetic and logic unit of the first executable memory cell that the first operand is to be designated as the left operand or right operand. Similarly, upon storing the second operand and the second executable code in the second executable memory cell 605, operation 635 begins. At the operation 635, the management unit of the second executable memory cell 605 instructs the arithmetic and logic unit of the second executable memory cell that the second operand is to be designated as the right operand or left operand. The operations 630 and 635 may be executed simultaneously. The operations 610-635 are similar to the operations 510-535 discussed above.

Further, instead of sending the data from one executable memory cell to another executable memory cell as discussed with respect to FIG. 5, in some embodiments, and as discussed in FIG. 6, the first code from the first executable memory cell 600 and the second code from the second executable memory cell 605 may be combined together. In the embodiments in which additional codes (e.g., third code, fourth code, etc.) are used, upon completion of the operations 630 and 635, the management units of the first executable memory cell 600 and the second executable memory cell 605 may receive the codes that are to be applied next and combine those codes.

Thus, at operation 640, the first code from the first executable memory cell 600 and the second code from the second executable memory cell 605 are combined together. The combination may be achieved, in some embodiments, by enabling the arithmetic and logic unit of the first executable memory cell 600 and/or the second executable memory cell 605 to access the data portion of the other executable memory cell. For example, in some embodiments, the management units of the first executable memory cell 600 and the second executable memory cell 605 may allow the arithmetic and logic unit of the first executable memory cell to access the data portion of the second executable memory cell to access the second operand. In other embodiments, the management units of the first executable memory cell 600 and the second executable memory cell 605 may allow the arithmetic and logic unit of the second executable memory cell to access the data portion of the first executable memory cell to access the first operand. In other embodiments, the management units of the first executable memory cell 600 and the second executable memory cell 605 may allow the arithmetic and logic unit of the first executable memory cell to access the second operand in the second executable memory cell and allow the arithmetic and logic unit of the second executable memory cell to access the first operand in the first executable memory cell.

The arithmetic and logic unit having access to the first operand and the second operand may then apply the code to perform the two operand operation. In some embodiments, the functional blocks(s)/microprogram(s) of the arithmetic and logic units of the first executable memory cell 600 and the second executable memory cell 605 may be combined to form a combined functional block/microprogram. The combined functional block/microprogram may be allowed to access the data portions of the first executable memory cell 600 and the second executable memory cell 605 to perform the two operand operation. In some embodiments, the combination of the first code and the second code may be achieved by a shifting operation, as discussed below in greater detail. The result of the operation may be handled in a similar manner as discussed above with respect to FIG. 5.

Figure 7:
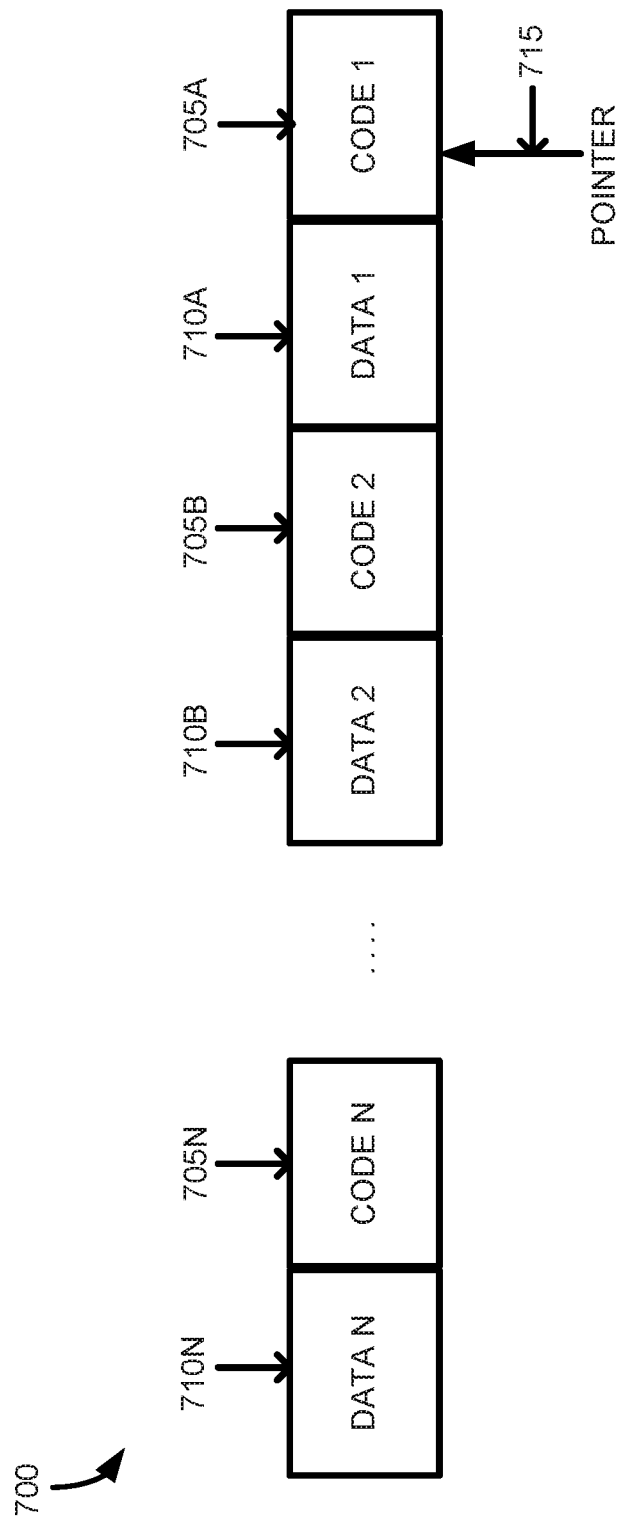
FIG. 7 is an example execution stream created from an instruction to be processed by the computing system of FIG. 1, in accordance with some embodiments of the present disclosure.

Turning now to FIG. 7, an example execution stream 700 is shown, in accordance with some embodiments of the present disclosure. The execution stream 700 is generated by the compilation unit (e.g., the compilation unit 145) of the computing system (e.g., the computing system 100). Upon receiving a sequence of instructions (e.g., to run one of the applications 135) from the host device (e.g., the host device 105), the compilation unit converts each instruction in the sequence of instructions into a form that is readily understood by the executable memory cells (e.g., the executable memory cells 140) and is ready for execution. Thus, the compilation unit converts input source code into target source code. The code that is loaded into the executable memory cells is the target source code.

By converting the input source code into target source code, the compilation unit creates an executable binary stream (e.g., the execution stream 700). As part of the conversion, in some embodiments, the compilation unit may break down an instruction into multiple sub-operations or sub-codes. For example, as discussed above, a two operand operation may involve multiple codes—a first code to identify the left operand, a second code to identify the right operand, a third code to apply the operation, and a fourth code to manage the result of the operation. Thus, each code above may be considered a sub-code or a one-step command. The instruction having multiple sub-codes may be executed by executing the sub-codes in a designated sequence.

In some embodiments, the compilation unit (e.g., the compilation unit 145) may be a just-in-time compiler. In other embodiments, the compilation unit may be another type of compiler that is suitable for use with the executable memory cells (e.g., the executable memory cells 140). Further, the execution stream 700 that is generated by the compilation unit may be considered an infinite tape of a Turing machine that includes multiple discrete cells, with each cell storing either code (e.g., sub-code) or data. Thus, the execution stream 700 may include a plurality of cells that include data interleaved with code. For example, a cell 705A of the execution stream 700 may store Code 1. The data on which Code 1 is to be applied may be stored in cell 710A. Cell 705B of the execution stream 700 may store Code 2 and cell 710B may store the data that Code 2 is to be applied on. If Code 1 is a sub-code of an instruction that includes multiple sub-codes, then Code 2 may be a second-in-sequence sub-code that is to be executed after Code 1. If Code 1 is a stand-alone code, then Code 2 may be a first sub-code of another instruction that has multiple sub-codes or another stand-alone code. Thus, the compilation unit (e.g., the compilation unit 145) creates a continuous stream of data and code (whether stand-alone code or sub-codes) that is to be executed by the executable memory cells (e.g., the executable memory cells 140). The execution stream 700 stores both code and data in a single stream. Thus, the execution stream 700 may be considered a "single execution stream."

Although the execution stream 700 shows the code cells (e.g., the cells 705A, 705B, 705N) to the right of the data cells (e.g., the cells 710A, 710B, 710N), in some embodiments, the code cells may be on the left of the data cells. Furthermore, although each code cell (e.g., the cells 705A, 705B, 705N) is separated from another code cell by a data cell (e.g., the cells 710A, 710B, 710N), in some embodiments, two or more code cells may be located adjacent to one another without a data cell in between. Likewise, in some embodiments, two or more data cells (e.g., the cells 710A, 710B, 710N) may be located adjacent to one another without a code cell (e.g., the cells 705A, 705B, 705N) in between. Generally speaking, the execution stream 700 and the placement of the code cells (e.g., the cells 705A, 705B, 705N) and the data cells (e.g., the cells 710A, 710B, 710N) in the execution stream may be dependent upon the type of instruction to be executed and the number of sub-codes in that instruction, the order in which those sub-codes are to be executed, as well as the data on which the sub-codes are to be applied.

The execution stream 700 may be executed using a pointer 715. The pointer 715 indicates the code cell of the execution stream 700 that is currently being executed. Once the code cell to which the pointer 715 is pointing has completed execution, the pointer moves to the next code cell in the sequence. For example, the pointer 715 may start at the cell 705A. When the pointer 715 is pointing to the cell 705A, the code that is associated with that cell is being executed. In some embodiments, the code from the cell 705A that the pointer 715 is pointing to may be read and loaded into an executable memory cell. In some embodiments, the management unit (e.g., the management unit 150) of the associated data processing unit (e.g., the data processing unit 130) may read the code from the cell 705A and send the code to a management unit of an appropriate executable memory cell for storing in the code portion thereof. The management unit may also send the data from the data cell 710A that may be associated with the code in the code cell 705A to the data portion of the executable memory cell. Upon receiving and storing the code and data, the executable memory cell may start execution, as discussed above with respect to FIGS. 4-6.

In some embodiments, the execution stream 700 may be stored in a sequence of executable memory cells. For example, code from each code cell (e.g., the cells 705A, 705B, . . . 705N) may be stored in the code portion of an executable memory cell and associated data from each data cell (e.g., the cells 710A, 710B, . . . 710N) may be stored in the data portion of the executable memory cell. Thus, when the pointer 715 points to a particular code cell, the code from that code cell and data from the associated data cell may already have been stored in an executable memory cell, and that executable memory cell may simply start executing the code.

Although the pointer 715 has been explained as moving from the right side to the left side of the execution stream 700, in some embodiments, the pointer may move from the left side to the right side. Additionally, although a single pointer is shown, in some embodiments, multiple pointers may be used in the execution stream 700 with each pointer being used for a portion of the execution stream.

Figure 8:
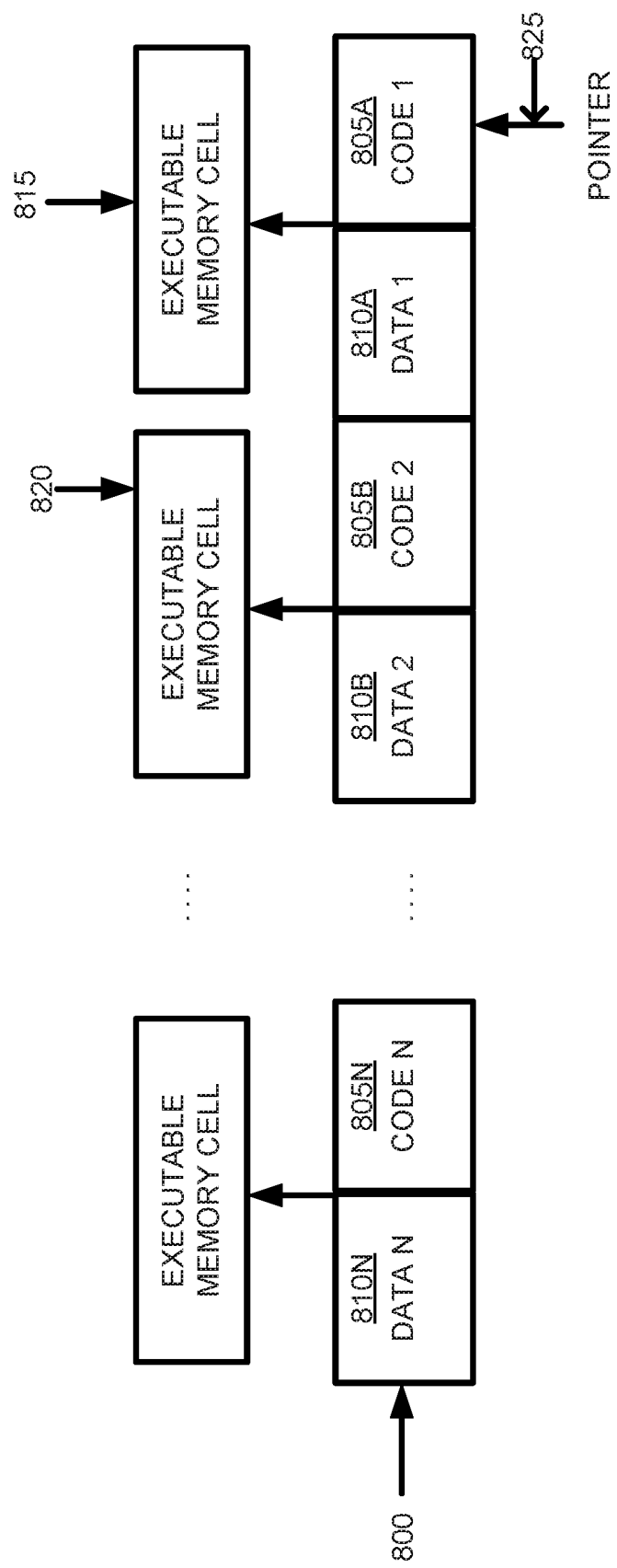
FIG. 8 is an example block diagram showing operations performed using the execution stream of FIG. 7, in accordance with some embodiments of the present disclosure.

From the execution stream 700, one and two operand operations may be performed. For example, and referring specifically to FIG. 8, example operations performed using a single execution stream 800 are shown, in accordance with some embodiments of the present disclosure. Similar to the execution stream 700, the execution stream 800 includes discrete code cells 805A, 805B, . . . 805N, and data cells 810A, 810B, . . . 810N. The execution stream 800 may be particularly suitable for performing one operand operations. Operations using the execution stream 800 may be performed in a sequential manner or a parallel manner.

To perform operations in a sequential manner, each cell of the execution stream 800 is traversed sequentially one after another. Each cell of data and code in the execution stream 800 is associated with an executable memory cell. Further, in some embodiments, one cell of data and one cell of code that is to be applied to that data may form a code/data cell pair, and that pair may be associated with the same executable memory cell. For example, in some embodiments, the code from the code cell 805A and the data from the data cell 810A may form a code/data cell pair, and may be associated with a first executable memory cell 815. Similarly, in some embodiments, the code from the code cell 805B and the data from the data cell 810B may form a code/data cell pair, and may be associated with a second executable memory cell 820, and so on.

Further, in some embodiments, code from the code cell and data from the data cell in a code/data cell pair of the execution stream 800 may be loaded into an executable memory cell when pointer 825 of the execution stream is pointing to that code cell. For example, in some embodiments, Code from the code cell 805A and Data 1 from the data cell 810A may be loaded into the first executable memory cell 815 when the pointer 825 is pointing to the code cell. In other embodiments, the entire (or at least a portion of the) execution stream 800 may be stored in executable memory cells before the execution of the first code cell (e.g., the code cell 805A) begins. Specifically, information from each code/data cell pair may be loaded into an executable memory cell before-hand, and when the pointer 825 points to the code cell of the code/data cell pair, the executable memory cell may begin execution. Regardless of when the code and data are stored in the executable memory cells, for a sequential execution, each code/data cell pair may be executed in a designated sequence, represented by the movement of the pointer. As an example, Code 1 from the code cell 805A may be executed in the first memory cell 815 before the code from the code cell 805B.

A one operand operation may include multiple sub-codes. For example, in some embodiments, a one operand operation may include two sub-codes: a first sub-code to apply the code to the data and a second sub-code to store the result of the operation. Thus, in the execution stream 800, the first sub-code may be stored in the code cell 805A and the second sub-code may be stored in the code cell 805B. The data or operand may be stored in the data cell 810A. To execute, the first sub-code from the code cell 805A may be stored in the code portion of the first executable memory cell 815 and the data from the data cell 810A may be stored in the data portion of the first executable memory cell. As discussed above, the loading of the code into the code portion and the data into the data portion may be facilitated by the management unit (not shown in FIG. 8) of the first executable memory cell 815. Upon loading the first sub-code and the data and applying the first sub-code to the data, the first executable memory cell 815 may store the result in the data portion of the second executable memory cell 820. The pointer 825 may move to the code cell 805B to load the second sub-code into the code portion of the second executable memory cell 820. Thus, the second executable memory cell 820 may receive data from the first executable memory cell 815 and the second sub-code from the execution stream 800. The second executable memory cell 820 may then apply the second sub-code to the data in the data portion thereof. The one operand operation may be performed as discussed above with respect to FIG. 4.

To perform operations in a parallel manner, each pair of data and code may be loaded into an executable memory cell in parallel. Thus, multiple executable memory cells may be deployed at the same time for a parallel execution. For example, Code 1 from the code cell 805A, Code 2 from the code cell 805B, and code from the code cell 805C may be loaded into the code portions of first, second, and third executable memory cells, respectively, in parallel. Similarly, data from the data cell 810A, data from the data cell 810B, and data from the data cell 810C may be loaded into the data portion of the first, second, and third executable memory cells, respectively, in parallel. Each of the first, second, and third executable memory cells may thus execute in parallel by applying the code in their respective code portions to the data stored in their respective data portions. Parallel operation is particularly advantageous when the codes in the code cells 805A, 805B, and 805C are not to be executed in a designated sequence. For example, when the execution of the code in the code cell 805B does not require the completion of execution of the code in the code cell 805A, parallel execution may be used. In some embodiments, parallel execution may be particularly advantageous when the same code is to be applied to different data such that the same code may be stored in each code cell of the execution stream 800 and each data cell may have an instance of the data on which that code is to be applied.

In some embodiments, part of the execution stream 800 may be executed sequentially, while another part of the execution stream may be executed in parallel. Further, in some embodiments, as the code and the data in each cell of the execution stream 800 changes, execution between sequential and parallel may also change. Thus, based upon the code that is stored in the execution stream 800 and whether the execution of a particular code is dependent upon the completion of execution of another code, the execution stream may be executed sequentially or parallel.

Figure 9:
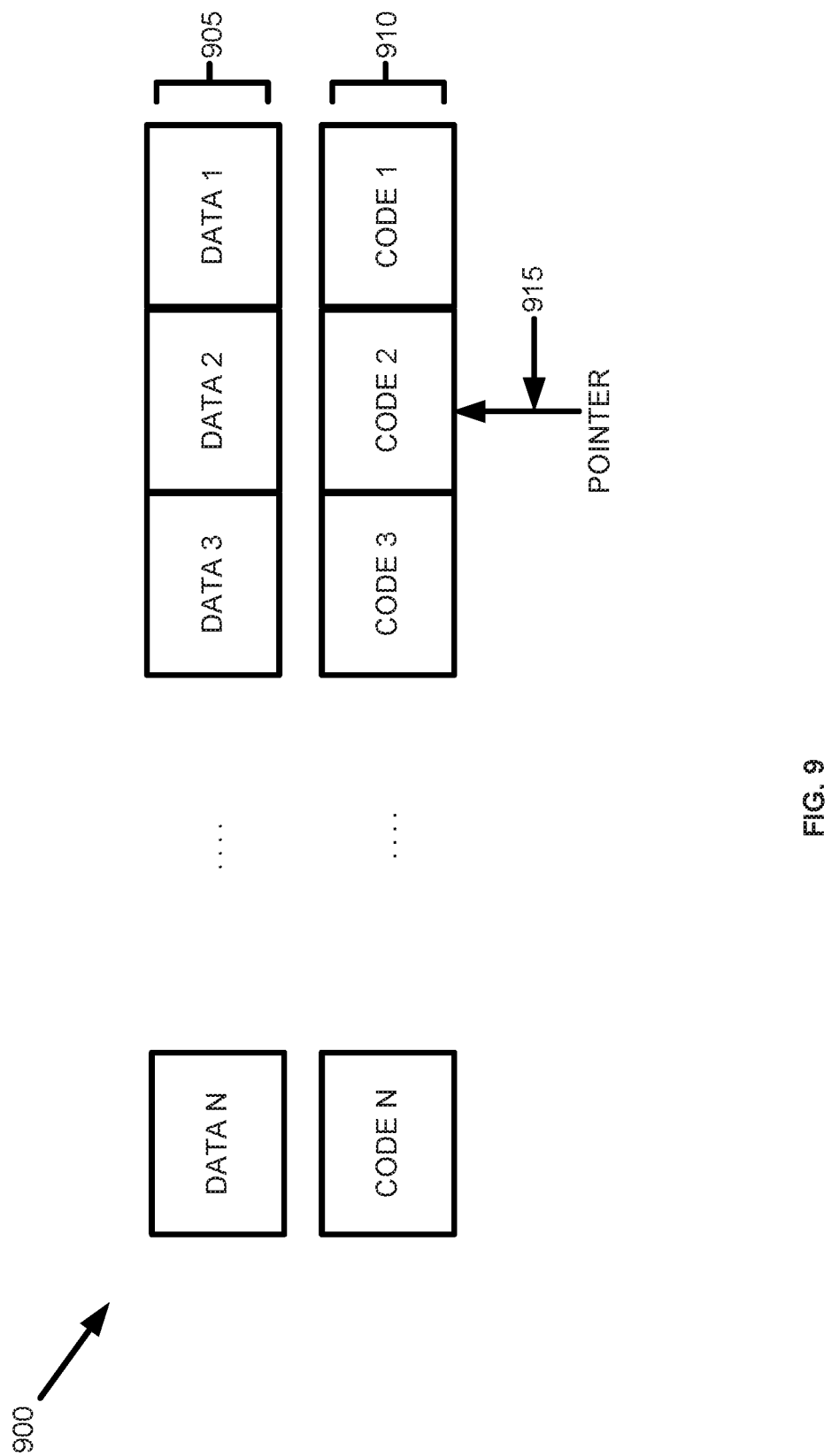
FIG. 9 is another example execution stream created from an instruction to be processed by the computing system of FIG. 1, in accordance with some embodiments of the present disclosure.

Referring now to FIG. 9, an example execution stream 900 is shown, in accordance with some embodiments of the present disclosure. In contrast to the execution stream 700 which is a single execution stream having interleaved data and code in one execution stream, the execution stream 900 is a dual execution stream having separate execution streams for data and code. Thus, the execution stream 900 includes a data stream 905 and a code stream 910. The data stream 905 is configured to store data and the code stream 910 is configured to store code. The execution stream 900 may be created by the compilation unit (e.g., the compilation unit 145) upon receiving an instruction from the host device (e.g., the host device 105).

The data stream 905 and the code stream 910 of the execution stream 900 each include a plurality of discrete cells. In some embodiments, each code cell in the code stream 910 may be associated with one data cell in the data stream 905. Further, in some embodiments, a code cell/data cell pair may be associated with one executable memory cell. A pointer 915 may be used to track the execution of the code stream 910. In some embodiments, and particularly when the execution stream 900 is used for performing operations by shifting, the pointer 915 may not be provided, or not used if provided. By providing a separate data stream (e.g., the data stream 905) and a separate code stream (e.g., the code stream 910), each of those streams may be controlled independently. Other aspects of the execution stream 900 are similar to the execution stream 700, and therefore not discussed again.

Figure 10:
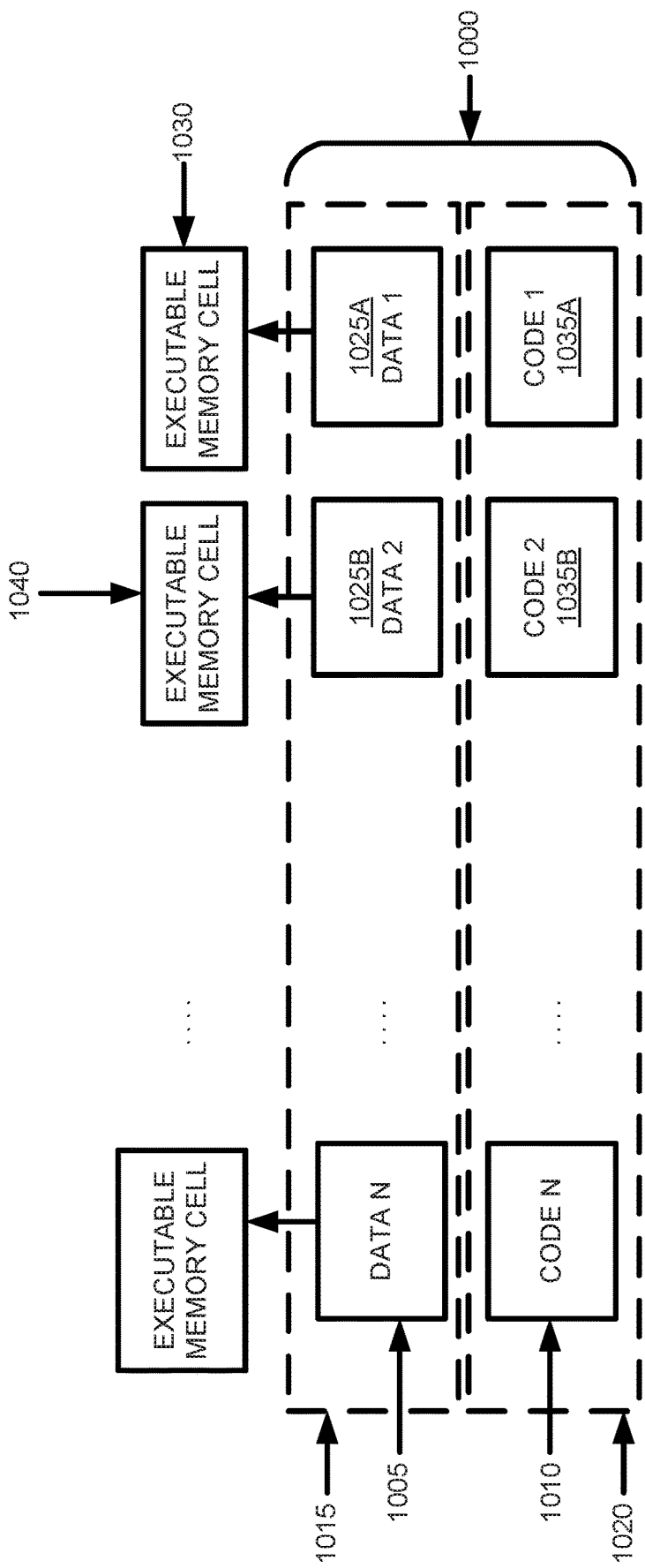
FIG. 10 is an example block diagram showing operations performed using the execution stream of FIG. 9, in accordance with some embodiments of the present disclosure.

Further, similar to the execution stream 800, the execution stream 900 may be used to perform operations in a sequential or parallel manner, as discussed with respect to FIG. 10. Thus, FIG. 10 shows an example execution stream 1000, in accordance with some embodiments of the present disclosure. The execution stream 1000 includes a data stream 1005 and a code stream 1010. By virtue of being in separate streams, data in the data stream 1005 can be used independently from the code in the code stream 1010, as represented by dashed boxes 1015 and 1020, respectively. Also, similar to the execution stream 800, operations using the execution stream 1000 may be performed in a sequential manner or a parallel manner.

Generally speaking, the sequential and parallel operation using the execution stream 1000 is similar to the sequential and parallel operation discussed above with respect to the execution stream 800. Instead of associating one code cell and one data cell of the same stream (e.g., the execution stream 800) with one executable memory cell, the execution stream 1000 associates one code cell from the code stream 1010 and one data cell from the data stream 1005 with one executable memory cell. For example, to perform a one operand sequential operation, the compilation unit (e.g., the compilation unit 145) may send data from data cell 1025A to be loaded into a data portion of a first executable memory cell 1030. The compilation unit may also send code from code cell 1035A to be loaded into a code portion of the first executable memory cell 1030. Similarly, data from the data cell 1025B and code from the code cell 1035B may be loaded into a second executable memory cell 1040. The second executable memory cell 1040 may be same as or different from the first executable memory cell 1030 for a sequential operation. Thus, each code cell/data cell pair of the execution stream 1000 is executed in a sequential order.

To perform a two operand operation in a sequential manner using the execution stream 1000, a shifting operation may be used. The shifting operation is discussed in greater detail below with respect to FIG. 11. For parallel execution using the execution stream 1000, each code cell/data cell pair may be associated with a separate executable memory cell. Parallel execution may be advantageous when the code is not to be executed in a designated sequence (e.g., when the execution of code in one code cell is not dependent upon the execution of code in another code cell). To execute the execution stream 1000 in parallel, the data from the data cell 1025A and code from the code cell 1035A may be loaded into the first executable memory cell 1030, the data from the data cell 1025B and code from the code cell 1035B may be loaded into the second executable memory cell 1040, and so on, in parallel. The parallel execution of the execution stream 1000 is similar to the parallel execution of the execution stream 800 discussed above.

Turning now to FIG. 11, an example execution stream 1100 is shown, in accordance with some embodiments of the present disclosure. FIG. 11 is discussed in conjunction with FIGS. 5 and 6. The execution stream 1100 is similar to the execution stream 1000. Thus, the execution stream 1100 includes a data stream 1105 and a code stream 1110. The data stream 1105 and the code stream 1110 both include a plurality of cells for storing data and code, respectively. A two operand operation may be performed as discussed above with respect to FIGS. 5 and 6. Specifically, the two operand operation of FIGS. 5 and 6 may be performed using a shifting operation. To perform the shifting operation, the code stream 1110 may be shifted one code cell at a time. As discussed above, an instruction for a two operand operation may include multiple sub-codes as follows: a first sub-code to identify the first operand as left/right operand, a second sub-code to identify the second operand as left/right operand, a third sub-code to apply the code on the first and second operand, and a fourth sub-code to manage the result of the operation.

Thus, to perform a two operand operation, the first operand may be stored in data cell 1115A of the data stream 1105 and the second operand may be stored in data cell 1115B of the data stream. Similarly, and at the start of the operation, the first sub-code may be stored in code cell 1120A of the code stream 1110. The data cell 1115A and the code cell 1120A may be associated with a first executable memory cell. The data cell 1115B and code cell 1120B may be associated with a second executable memory cell. At operation 1125, the first operand may be loaded into the data portion of the first executable memory cell from the data cell 1115A and the second operand may be loaded into the data portion of the second executable memory cell from the data cell 1115B. Additionally, the first sub-code may be loaded into the code portion of the first executable memory cell. The operation 1125 lead to the operations 510, 515, and 520 of FIG. 5 and the operations 610, 615, and 620 of FIG. 6. Upon loading the first operand and the first sub-code into the first executable memory cell, the first executable memory cell may perform the operation 530 of FIG. 5 and the operation 630 of FIG. 6.

Upon completing execution of the operations 530/640 from FIGS. 5/6, the execution stream 1100 shifts the code stream 1110 by one code cell at operation 1130. By virtue of the shifting operation, the code cell 1120B receives the first sub-code, while the second sub-code is loaded into the code cell 1120A. Also at the operation 1130, the first sub-code from the code cell 1120B is loaded into the code portion of the second executable memory cell. Thus, the operation 1130 leads to the operation 525 of FIG. 5, and the operation 625 of FIG. 6. In some embodiments, the second operand from the data cell 1115B may be loaded into the second executable memory cell at the operation 1130 instead of at the operation 1125. Additionally, at the operation 1130, the second sub-code from the code cell 1120A is now loaded into the code portion of the first executable memory cell. Thus, at the operation 1130, the first executable memory cell stores the first operand and the second sub-code, while the second executable memory cell stores the second operand and the first sub-code. The second executable memory cell may apply the operation 535 of FIG. 5 and the operation 635 of FIG. 6.

At operation 1135, the third sub-code is loaded into the code cell 1120A and the second sub-code is shifted to the code cell 1120B. Also, at the operation 1135, the third sub-code is loaded into the first executable memory cell and the second sub-code is loaded into the second executable memory cell. Further, if the process of FIG. 5 is used for performing the two operand operation, the second executable memory cell may transfer the second operand (at the operation 540) to the first executable memory cell at this stage. If the process of FIG. 6 is used, the first executable memory cell already has the second sub-code by virtue of the shifting operation. Thus, the operation 640 occurs by virtue of the shifting operation. Also at the operation 1135, upon receiving the third sub-code, the first executable memory cell performs the two operand operation, as discussed at the operation 545 of FIG. 5 and the operation 645 of FIG. 6.

Then, at operation 1140, the code cell 1120A is loaded with the fourth sub-code, while the third sub-code is shifted into the code cell 1120B. Thus, at the operation 1140, the fourth sub-code is loaded into the first executable memory cell and the third sub-code is loaded into the second executable memory cell. Upon receiving the fourth sub-code, the first executable memory cell stores the result of the two operand operation in accordance with the fourth sub-code. At operation 1145, the fourth sub-code is shifted into the code cell 1120B and loaded into the second executable memory cell. The loading signals to the second executable memory cell that the two operand operation has ended. Thus, for a two operand operation, each of the first and second executable memory cells receive all of the four sub-codes.

Thus, the present disclosure provides an executable memory cell that is configured to process data in the place the data is stored. The present disclosure also provides a mechanism to convert instructions into a form that is readily understood by the executable memory cells for processing. It is to be understood that any examples used herein are simply for purposes of explanation and are not intended to be limiting in any way.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances, where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A memory system comprising:
   a memory comprising a first executable memory cell; and
   a compilation unit configured to:
      receive a sequence of instructions from a host device;
      convert the sequence of instructions into an execution stream comprising a continuous stream of code and data;
      load a first code from the execution stream into a code portion of the first executable memory cell; and
      load a first data from the execution stream into a data portion of the first executable memory cell;
   wherein the first executable memory cell is configured to apply the first code to the first data via an arithmetic and logic unit of the first executable memory cell.

2. The memory system of claim 1, wherein the execution stream comprises a plurality of cells, each comprising either code or data.

3. The memory system of claim 1, wherein the execution stream comprises a data stream and a code stream.

4. The memory system of claim 1, wherein the compilation unit is configured to determine that a first instruction in the sequence of instructions comprises a plurality of sub-codes, and wherein the compilation unit is further configured to store each of the plurality of sub-codes in the execution stream in a designated sequence.

5. The memory system of claim 4, wherein each of the plurality of sub-codes is executed by the first executable memory cell in the designated sequence.

6. The memory system of claim 1, wherein:
   the memory further comprises a second executable memory cell; and
   the compilation unit is further configured to:
   receive indication that the application of the first code to the first data in the first executable memory cell is complete;
   load a second code in a code portion of the second executable memory cell upon receiving the indication of completion; and
   load a second data in a data portion of the second executable memory cell upon receiving the indication of completion.

7. The memory system of claim 1, wherein the execution stream comprises a plurality of sub-codes and a plurality of data, wherein each of the plurality of sub-codes is associated with one of the plurality of data to form a plurality of code/data pairs, and wherein each of the plurality of code/data pairs is associated with one executable memory cell for execution.

8. The memory system of claim 7, wherein each of the plurality of code/data pairs is executed sequentially in a designated sequence.

9. The memory system of claim 7, wherein each of the plurality of code/data pairs is executed in parallel.

10. The memory system of claim 1, wherein a two operand operation is performed using a shifting operation in the execution stream.

11. A memory system comprising:
    a memory comprising a first executable memory cell; and
    a compilation unit configured to:
       create a code stream from a sequence of instructions, wherein the code stream comprises a plurality of code cells, each of the plurality of code cells storing a sub-code;
       create a data stream from the sequence of instructions for storing a first operand and a second operand;
       load a first sub-code into the first executable memory cell, wherein the first sub-code is stored in a first code cell of the plurality of code cells;
       load the first operand into the first executable memory cell; and
       shift the first sub-code from the first code cell to a second code cell of the plurality of code cells.

12. The memory system of claim 11, wherein the compilation unit is further configured to:
    load a second sub-code in the first code cell;
    load the second sub-code into the first executable memory cell;
    load the first sub-code from the second code cell to a second executable memory cell of the memory; and
    shift the second sub-code to the second code cell.

13. The memory system of claim 11, wherein the compilation unit is further configured to load the second operand into a second executable memory cell of the memory.

14. The memory system of claim 13, wherein the first executable memory cell and the second executable memory cell together perform a two operand operation.

15. A non-transitory computer-readable media including computer-executable instructions embodied thereon that, when executed by a processor, cause the processor to perform a process comprising:
    receiving a sequence of instructions;
    converting the sequence of instructions to create an execution stream comprising a continuous stream of code and data;
    loading a first code from the execution stream into a code portion of a first executable memory cell;
    loading a first data from the execution stream into a data portion of the first executable memory cell; and
    applying the first code to the first data via an arithmetic and logic unit of the first executable memory cell.

16. The non-transitory computer-readable media of claim 15, wherein the process further comprises creating a single execution stream comprising code interleaved with data.

17. The non-transitory computer-readable media of claim 15, wherein the process further comprises creating a code stream and a data stream.

18. The non-transitory computer-readable media of claim 15, wherein a first instruction in the sequence of instructions comprises a plurality of sub-codes to be executed in a designated sequence, and wherein the execution stream stores the plurality of sub-codes in the designated sequence.

19. The non-transitory computer-readable media of claim 15, wherein the execution stream comprises a plurality of cells, and wherein each of the plurality of cells is associated with one executable memory cell.

20. The non-transitory computer-readable media of claim 15, wherein the process further comprises:
  loading a second code in a code portion of a second executable memory cell upon receiving an indication of completion of a first operation being performed by the first executable memory cell; and
  loading a second data in a data portion of the second executable memory cell upon receiving the indication of completion of the first operation.

* * * * *